US005478375A

United States Patent [19]
Hudson

[11] Patent Number: 5,478,375
[45] Date of Patent: Dec. 26, 1995

[54] SEALANTS FOR FERTILIZER COMPOSITIONS CONTAINING NATURAL WAXES

[75] Inventor: Alice P. Hudson, Jupiter, Fla.

[73] Assignee: Lesco Inc., Rocky River, Ohio

[21] Appl. No.: 327,379

[22] Filed: Oct. 21, 1994

Related U.S. Application Data

[62] Division of Ser. No. 131,330, Oct. 4, 1993, abandoned.

[51] Int. Cl.$^6$ ........................................................ C05C 9/00
[52] U.S. Cl. ............................ 71/28; 71/64.02; 71/64.07; 71/64.11; 71/64.13
[58] Field of Search .................................. 428/407; 71/28, 71/64.02, 64.07, 64.11, 64.13

[56] References Cited

U.S. PATENT DOCUMENTS

| | | | |
|---|---|---|---|
| 3,342,577 | 9/1967 | Blouin et al. | 71/64.11 |
| 3,372,019 | 3/1968 | Fox | 71/64.11 |
| 4,042,366 | 8/1977 | Fersch et al. | 71/64.11 |
| 4,081,264 | 3/1978 | Ali | 71/64.11 |
| 5,219,465 | 6/1993 | Goertz et al. | 71/64.11 |
| 5,300,135 | 4/1994 | Hudson et al. | 71/64.11 |

*Primary Examiner*—Peter A. Szekely

[57] ABSTRACT

Novel sealants for sulfur coated urea fertilizer are comprised mixtures of fatty esters of polyhydric alcohols and polymers which are soluble therein and contain ester, carboxylate, or hydroxyl functionality; said mixtures are preferably crosslinked with a transesterification catalyst, and optionally contain dicarboxylic or tricarboxylic acids with 9 to 60 carbon atoms, or mixtures thereof.

11 Claims, No Drawings

1

SEALANTS FOR FERTILIZER COMPOSITIONS CONTAINING NATURAL WAXES

CROSS REFERENCE TO RELATED APPLICATION

This is a division of U.S. patent application Ser. No. 08/131,330, filed Oct. 4, 1993, now abandoned.

BACKGROUND OF THE INVENTION

1. Field of the Invention

Urea granules or prills which have been coated with sulfur to slow the rate of dissolution of the urea in the soil when they are applied as a fertilizer can be coated with a sealant to further slow the release of urea. This invention relates to novel sealant compositions which are comprised of mixtures of fatty esters of polyhydric alcohols and polymers which are soluble therein and contain ester, carboxylate, or hydroxyl functionality; said mixtures are preferably crosslinked with a transesterification catalyst, and optionally contain dicarboxylic or tricarboxylic acids with 9 to 60 carbon atoms, or mixtures thereof.

2. Description of the Prior Art

The process for sulfur coating of urea granules or prills was developed in 1968 by the Tennessee Valley Authority (TVA) in Muscle Shoals, Ala., as an economical system for reducing the rate of dissolution of urea particles when they are applied to the soil as fertilizer. U.S. Pat. No. 3,342,577 describes this sulfur coating process and also the sealant material that was necessary to fill in the holes that result naturally in the sulfur coating as it cools. The TVA process is also described in Sulphur Inst. J. 4(3) 2–6 (1968), ibid. 8(4) 2–5 (1972a) and ibid. 8(4) 6–8 (1972b). The TVA recommendation for the sealant now used extensively in the manufacture of sulfur coated urea is a mixture of 30% polyethylene resin in 70% bright stock mineral oil.

U.S. Pat. No. 4,042,366 describes a modification of this process in which particles of water soluble nutrients are embedded in a soft petroleum wax coating to provide anticaking properties to the coated particles as well as nutrient benefits.

The process is further described in *Sulfur Coating of Urea Treated with Atapulgite Clay*, Gullett, G. L.; Simmons, C. L.; and Lee, R. G.; presented at the 198th American Chemical Society meeting in Miami Beach, Fla., in September 1989.

The requirement for a sealant for sulfur coated urea (SCU) has been documented by McClellan and Scheib (Sulphur Inst. J. 9(¾) 8–12 (1973), and by Scheib and McClellan ibid. 12(1) 2–5 (1976).

A description of slow release urea and NPK fertilizers is given in Hort. Rev. 1 79–140 (1979).

The wax-oil sealants as described by TVA publications and currently being applied to SCU require the addition of a clay conditioning agent at levels nearly equal to that of the wax sealant to prevent caking and provide a free flowing product. A typical process may require 3% of the wax-oil sealant and 2% of the clay conditioning agent on the weight of the SCU, or 67% clay on the weight of the sealant. This requires large scale clay handling equipment in addition to the equipment necessary to apply the molten sulfur and wax sealant.

When the clay conditioned SCU is applied in the field by mechanical spreaders, the clay or wax-clay mixtures tend to be removed from the SCU particles by the abrasive action of the screw conveyors and the mechanical spreading wheel, resulting in a build-up of wax-clay on various parts of the machine and requiring frequent shut-downs for cleaning.

An additional problem with SCU from current production methods is the reduction or loss in water insoluble nitrogen (WIN) which occurs on shipping the SCU from the production point to the local blending point. This loss is exacerbated by the further abrasion which occurs in the blending and bagging operations. Urea and blended fertilizers when they are mixed and bagged must be labelled with their WIN content, and it is the responsibility of the manufacturer to assure that the value does not decrease below the labeled value during shipping and storage. Thus a significant loss in WIN resulting from handling in modern high-speed equipment can create a situation in which the fertilizer is mislabeled and subject to recall.

Hydrogenated tallow and related esters have been used to obtain sustained release of pharmaceutical materials. U.S. Pat. No. 4,132,753 describes a process for mixing such materials with finely divided glyceride wax type materials with radiant heat to imbed the pharmaceutical materials in the wax materials. Eur. Pat. Appl. EP 383,406 describes preparing a dispersion of an active ingredient in molten fatty acid derivatives and spraying into a cooled gas stream to form the encapsulated active materials.

U.S. Pat. No. 4,401,782 describes mixtures of hydrogenated tallow and acrylic acid-ethylene copolymers, and U.S. Pat. No. 4,253,840 describes mixtures of hydrogenated tallow and ethylene-vinyl acetate copolymers, both of which are used to prepare textile sizing materials.

OBJECTS

It is an object of this invention to provide sealants for SCU which will act to give the SCU granules or prills high water insoluble nitrogen (WIN) values and thus provide urea prills or granules which will release the urea to the soil at a slow uniform rate over an extended period of time.

It is a further object of this invention to provide a sealant for SCU which can be readily applied to the SCU particles in a molten form, and provides a sealed SCU product which becomes non-blocking and free flowing on cooling to ambient temperature, and therefore does not require a large amount of clay or other conditioning agent and thus minimizes the build-up of deposits in the field application equipment.

Another object of this invention is to provide a sealant for SCU which provides high WIN values which are not significantly decreased by the abrasion encountered in shipping, mixing, bagging, and storage.

A further object of the invention is to provide a sealant for SCU which is based on renewable wax materials derived from natural sources rather than on nonrenewable petroleum based products.

Other objects and further scope of applicability of the present invention will become apparent from the detailed descriptions given herein: it should be understood, however, that the detailed descriptions, while indicating preferred embodiments of the invention are given by way of illustration only, since various changes and modifications within the spirit and scope of the invention will become apparent from such descriptions.

SUMMARY OF THE INVENTION

We have discovered that urea prills or granules coated with sulfur in accordance with the methods developed by the TVA, and subsequently sealed with novel sealant compositions which are comprised of mixtures of fatty esters of polyhydric alcohols and polymers which are soluble therein and contain ester, carboxylate, or hydroxyl functionality, said mixtures preferably crosslinked with a transesterification catalyst, and optionally containing a dicarboxylic or tricarboxylic acid containing from about 9 to 60 carbon atoms or mixtures thereof, provide a free flowing abrasion resistant fertilizer or fertilizer component with a slow release rate of soluble nitrogen to the soil.

The sealant compositions are prepared by mixing certain polymers which have esters carboxylate, or hydroxyl functionality, with fatty esters of polyhydric alcohols, at temperatures such that the resulting composition is molten, and preferably adding a transesterification catalyst and optionally a dicarboxylic or tricarboxylic acid containing about 9 to 60 carbon atoms or mixtures thereof, and allowing a transesterification reaction to occur.

The polymers include copolymers of ethylene with acrylic or methacrylic acid or esters thereof, and copolymers of ethylene with vinyl acetate.

The fatty acid esters of polyhydric alcohols include hydrogenated triglycerides of both animal and vegetable origin. Also included are the fatty triacyl derivatives of sorbitol. The extent of hydrogenation of the alkyl portion of the esters is such that the iodine value is less than 15 and preferably less than 5 to assure that the final wax composition will be non-tacky, and produce fertilizer particles which will be free flowing.

The crosslinking agents are chosen from those conventionally used to transesterify triglycerides in the production of various derivatives. They include titanium esters of lower alkyl alcohols, tin compounds, alkali metal hydroxides and alkali metal salts of lower alkyl alcohols.

Optionally and preferably the compositions can be further crosslinked by the addition of dicarboxylic or tricarboxylic acids containing about 9 to about 60 carbon atoms or mixtures thereof.

This invention also relates to the process of forming free flowing, abrasion resistant slow release fertilizer particles which in its essential part involves contacting the sealant compositions with sulfur coated fertilizer granules at a temperature above the melting point of the sealant composition with sufficient agitation to allow for a uniform coating and cooling with continuous agitation to a temperature below the congealing point of the sealant composition.

DESCRIPTION OF THE PREFERRED EMBODIMENTS

The polymers of the invention comprise from about 2 to about 25 percent, and preferably from about 5 to 15 percent of the total composition, and include:

A. Ethylene-vinyl acetate copolymers in which the weight ratio of ethylene to vinyl acetate is from about 20 to about 1.5, and the melt index is from about 1 to about 500, and preferably from about 1 to about 20; and B. Ethylene-acrylic acid copolymers in which the weight ratio of ethylene to acrylic acid is from about 50 to about 10.

C. Ethylene copolymers of acrylic or methacrylic acid esters in which the weight ratio of ethylene to acrylate or methacrylate is from about 20 to about 2, and the melt index is from about 1 to about 500, and preferably from about 1 to about 20.

Such polymers are soluble in all proportions in the esters of this invention and the resulting composites have congealing points as defined by ASTM 938 of less than about 105° C., preferably less than 90° C., and most preferably from about 45° C. to 85° C. The compositions however have drop melting points as defined by ASTM 127 above about 55° C. This melting point hysteresis effect allows the resulting sealed fertilizer granules to remain free flowing even when stored at elevated temperatures.

Suitable ethylene-vinyl acetate copolymers are produced and marketed by a number of manufacturers. Products useful in the present invention include ELVAX Resins produced by DuPont, A-C 400 series of resins produced by Allied Corporation, ESCORENE Resins produced by Exxon Chemical Company, ELVACE Resins produced by Reichhold Chemicals, Inc., and EVA copolymers produced by Union Carbide Corporation. The vinyl acetate content is from about 5 percent to about 40 percent by weight of the copolymer. If less than 5 percent vinyl acetate is present, the copolymer does not significantly improve the adhesion properties of the final sealant coating, and if more than 40 percent vinyl acetate is present the resulting copolymer is not compatible with the fatty ester portion of the sealant. Preferably the copolymers contain from about 15 to 30 percent vinyl acetate.

The molecular weight of the copolymer is such that the viscosities of the molten copolymer-fatty ester mixtures are sufficiently low as to be easily applied through a nozzle to the SCU. This results when the melt index of the polymer is at least about 1 and less than about 500, and preferably between 1 and 20 and most preferably between 2 and 5.

Ethylene acrylic copolymers are produced by Allied Corporation under the trade names A-C 540, A-C 580, and A-C 5120, and by Dow Chemical Company under the trade name PRIMACOR. In the copolymers useful in the present invention the acrylic acid comprises a maximum of about 10% by weight of the copolymer. Copolymers with a higher acrylic acid content are not compatible with the fatty ester materials.

Copolymers of ethylene and ethyl acrylate are produced by Union Carbide and sold under the trade name DPDA. Products useful in this invention contain from about 15 to about 30 percent ethyl acrylate and have melt indexes from about 1 to about 20.

The acyl esters of polyhydric alcohols of this invention comprise about 65 to 98 percent, and preverably between about 80 and 95 percent of the compositions, and include:

A. Triacyl esters of glycerine, preferably derived from natural sources, said acyls containing from about 14 to about 22 carbon atoms, being essentially free of unsaturation, defined by having an iodine value of less than 15 and preferably less than 10 and most preferably from 1 to 5. Suitable triacyl glycerides include compositions produced by the hydrogenation of natural fats and oils derived from lard oil, beef tallow, mutton tallow, cod liver oil, herring oil, menhaden oil, corn oil, palm oil, peanut oil, rapeseed oil, soybean oil, and sunflower seed oil. Preferred triacyl glycerides are hydrogenated beef tallow, hydrogenated soybean oil and hydrogenated canola oil, because of their availability and low cost. These products are manufactured in large quantities by many producers. Typical products include hydrogenated tallow triglycerides sold as Neustrene 059 and Neustrene 060, hydrogenated soya triglycerides sold as Neustrene 064, and hydrogenated menhaden oil, sold as Neustrene 053, all available from Witco Humko Division.

B. Triacyl esters of sorbitan, such as sorbitan tristearate, sorbitan tripalmitate, or mixtures thereof.

The transesterification catalysts when present are added in catalytic amounts of from about 0.05 to about 1 percent of the composition, and can be any commercially available materials sold for this function. Preferred products are those which are soluble or dispersible in the molten polyhydric fatty acyl ester materials of this invention. Suitable products are tetraalkyl esters of titanium such as tetrapropyl titanate, tetrabutyl titanate, and tetraoctyl titanate, sold by DuPont under the trade names Tyzors TPT, TBT and TOT. Other preferred catalysts are organotin compounds such as dibutyltin dilaurate sold as Fascat 4202, dibutyltin oxide sold as Fascat 4201, butyltin trioctoate sold as Fascat 4102, and dibutyltin diacetate sold as Fascat 4200 all available from M&T Chemicals. Less preferred catalysts are alkali metal hydroxides and methoxides such as sodium hydroxide, potassium hydroxide, sodium methoxide and potassium methoxide. These products are not readily soluble in the wax compositions of this invention.

The dicarboxylic and tricarboxylic acids of this invention are aliphatic in nature and contain about 9 to about 60 carbon atoms and about 2 to 3 carboxyl moieties. When present they comprise from about 0.5 to about 10 percent, and preferably from about 1 to 5 percent of the compositions. Examples of suitable acids are azeleic acid, sebacic acid, dodecanedioic acid, dimer and trimer acids derived from tall oil, the dicarboxylic acid resulting from the Diels-Alder addition of acrylic acid to conjugated linoleic acid, the tricarboxylic acid resulting from the Diels-Alder addition of fumaric acid to rosin acids, and the dicarboxylic acid resulting from the dimerization of rosin acids. Preferred dicarboxylic and tricarboxylic acids include dimer and trimer acids sold by Emery Henkel under the trade name Empol. Another preferred acid is the Diels-Alder addition product of acrylic acid and conjugated linoleic acid sold by Westvaco under the trade name Diacid.

The compositions are further characterized by being non-blocking as films on a substrate of sulfur at 55°.C. when tested by the following method: A 15 g sample of SCU to which a sealant composition has been applied is placed in an aluminum dish, and a 100 g weight is placed on top of the urea sample. The weighted urea sample is placed in an oven at 55° C. After 1 hour, the weighted sample is removed from the oven and allowed to equilibrate to room temperature. The weight is removed, and the degree to which the coated SCU particles adhere to each other is evaluated. SCU sealed with the compositions of this invention do not adhere to each other by this test and thus will remain free-flowing after storage in bags or in storage bins at 55° C.

Other minor adjuvants commonly added to wax barrier coatings, such as antioxidants and microbicides, which are known to those skilled in the art, may be advantageously incorporated into the compositions of this invention.

It will be apparent that the sealant compositions of this invention can be advantageously used to provide slow release properties to other particulate substrates such as other fertilizer particles, pesticides, and other materials for which a sustained release is required when the materials are subjected to contact with water.

Another aspect of this invention is to the process for sealing SCU particles or other particles with the compositions of this invention. The process is dependent on the absence of volatile components in the compositions: the tendency of the compositions to spread spontaneously on the surface of the fertilizer particles, and thus give a coating free of voids and pin holes; and the relatively low viscosity of the molten compositions which allows them to be sprayed or otherwise metered onto the particles.

The process in its essential part involves contacting the sealant compositions with the SCU or other particles at a temperature above the melting point of the sealant composition with sufficient agitation to allow for a uniform coating, and cooling with continuous agitation to a temperature below the congealing point Of the sealant composition.

A preferred process is to place the SCU or other particles in a pan granulator, rotating drum, or other suitable mixing device for solid particles, warm the particles to about 60° C. to 100° C. and preferably to about 70° C. to 85° C., and introduce the sealant composition either in the form of a spray or liquid stream, or in the form of small pellets or prills which melt immediately on contacting the heated particles. The sealed particles are cooled in a rotating drum or in a fluid bed cooler, and becomes free flowing without the aid of a clay or other conditioning agent.

The following examples are provided to illustrate the preferred composition, the preferred method of preparation, and comparative evaluations with prior art compositions. In these examples and throughout the remainder of this disclosure, all percentages are by weight based on the total weight of all components in the described compositions.

EXAMPLE 1

A wax sealant composition was prepared as follows: 90 g of hydrogenated tallow with an iodine value of 2 was melted at 70° C. and 10 g of an ethylene-vinyl acetate copolymer containing 28 weight percent vinyl acetate and having a melt index of about 3 was added as pellets. The temperature was raised to 130° C. with vigorous agitation, and the mixture was stirred at 130°–150° C. for 1 hour until the polymer was completely dissolved in the wax. 2 g of dimer acid, AN 193 and 0.2 g of dibutyltindilaurate were added and the mixture allowed to react for 2 hours at 130° C., The product had a congealing point of 50° C. and a drop melting point of 62° C.

EXAMPLE 2

A wax sealant composition was prepared as follows: 90 g of hydrogenated tallow with an iodine value of 2 was melted at 70° C. and 10 g of an ethylene-ethyl acrylate copolymer containing 18 weight percent ethyl acrylate and having a melt index of 20 was added as pellets. The temperature was raised to 130° C. with vigorous agitation, and the mixture was stirred at 130°–150° C. for 1 hour until the polymer was completely dissolved in the wax. 0.5 g of tetraoctyl titanate was added and the mixture allowed to react for 2 hours at 130° C. The product had a congealing point of 75° C. and a atop melting point of 84° C.

EXAMPLE 3

The procedure of Example 1 was followed except that hydrogenated soybean oil with an iodine value of 2 was substituted for the hydrogenated tallow. The resulting product had a congealing point of 53° C. and a drop melting point of 63° C.

EXAMPLE 4

A wax sealant composition was prepared as follows: 90 g of hydrogenated soya with an iodine value of 2 was melted at 70° C. and 10 g of an ethylene-vinyl acetate copolymer containing 28 weight percent vinyl acetate and having a melt index of about 3 was added as pellets. The temperature was raised to 130° C. with vigorous agitation, and the mixture was stirred at 130°–150° C. for 1 hour until the polymer was completely dissolved in the wax. The resulting composition had a congealing point of 52° C. and a drop melting point of 63° C.

EXAMPLE 5

The procedure of Example 1 was followed except that Diacid was substituted for the dimer acid. The resulting product had a congealing point of 50° C. and a drop melting point of 61° C.,

EXAMPLE 6

The procedure of Example 1 was followed except that fumarized rosin was substituted for the dimer acid.

EXAMPLE 7

The procedure of Example 1 was followed except that rosin dimer was substituted for the dimer acid.

EXAMPLE 8

The procedure of Example 4 was followed except that an ethylene-vinyl acetate copolymer containing 18% vinyl acetate and having a melt index of 150 was used.

EXAMPLE 9

A wax sealant composition was prepared as follows: 75 g of hydrogenated tallow with an iodine value of 2 was melted at 70° C. and 25 g of an ethylene-vinyl acetate copolymer containing 28 weight percent vinyl acetate and having a melt index of about 3 was added as pellets. The temperature was raised to 130° C. with vigorous agitation, and the mixture was stirred at 130°–150° C. for 1 hour until the polymer was completely dissolved in the wax.

EXAMPLE 10

The procedure of Example 4 was followed except that an ethylene-vinyl acetate copolymer containing 40% vinyl acetate and having a melt index of 57 was used.

EXAMPLE 11

A wax sealant composition was prepared as follows: 90 g of hydrogenated soya with an iodine value of 2 was melted at 70° C. and 10 g of an ethylene-acrylic acid copolymer containing 5 weight percent acrylic acid was added. The temperature was raised to 130° C. with vigorous agitation, and the mixture was stirred at 130°–150° C. for 1 hour until the polymer was completely dissolved in the wax.

EXAMPLE 12

A wax sealant composition was prepared as follows: 90 g of hydrogenated tallow with an iodine value of 2 was melted at 70° C. and 10 g of an ethylene-vinyl acetate copolymer containing 28 weight percent vinyl acetate and having a melt index of about 3 was added as pellets. The temperature was raised to 130° C. with vigorous agitation, and the mixture was stirred at 130°–150° C. for 1 hour until the polymer was completely dissolved in the wax. 5 g of dimer acid, AN 193 and 0.4 g of dibutyltindilaurate were added and the mixture allowed to react for 2 hours at 130° C. The product had a congealing point of 50° C. and a drop melting point of 62° C.

EXAMPLE 13

A wax sealant composition was prepared as follows: 90 g of hydrogenated tallow with an iodine value of 28 was melted at 70° C. and 10 g of an ethylene-ethyl acrylate copolymer containing 18 weight percent ethyl acrylate and having a melt index of 20 was added as pellets. The temperature was raised to 130° C. with vigorous agitation, and the mixture was stirred at 130°–150° C. for 1 hour until the polymer was completely dissolved in the wax. 1.0 g of tetrabutyl titanate was added and the mixture allowed to react for 2 hours at 130° C. The product was tacky, and when applied to SCU granules produced a product that was not free flowing.

EXAMPLE 14

A wax sealant composition was prepared as follows: 90 g of hydrogenated tallow with an iodine value of 8 was melted at 70° C. and 10 g of an ethylene-ethyl acrylate copolymer containing 18 weight percent ethyl acrylate and having a melt index of 20 was added as pellets. The temperature was raised to 130° C. with vigorous agitation, and the mixture was stirred at 130°–150° C. for 1 hour until the polymer was completely dissolved in the wax. 0.5 g of tetraoctyl titanate was added and the mixture allowed to react for 2 hours at 130° C. The product was not tacky, and when applied to SCU granules resulted in a free flowing product.

The wax sealant compositions of Examples 1–14 were applied to sulfur coated urea granules containing 15% sulfur by the following procedure: 100 g of SCU were heated to 75° C. in a stainless steel pan, 2 g of molten product at 75° C. were added and the mixture agitated gently at 75° C. for 2 minutes. The molten wax coated SCU granules were cooled with gentle agitation to 40° C. in 2–5 minutes.

The resulting sealed SCU granules were tested for slow release properties by periodically measuring the amount of urea which had leached from the granules after standing in water at 25° C. Tests were conducted as follows: 10 g of the sealed SCU were placed in 90 g of water in a tightly closed bottle at 25° C. and gently swirled. The amount of urea dissolved in the water at intervals was measured by determining the refractive index of the water phase. The amount of dissolved urea was divided by the amount initially in the granules to determine the proportion which had dissolved.

The sealed SCU granules were also tested for abrasion resistance by the following procedure: 30 g of the sealed product were dropped 5 times from a height of 6 ft through a 5 in diameter PVC pipe onto a stainless steel surface. The slow release properties of the abraded samples was determined as described above and compared to the slow release properties of the unabraded material.

The results of these tests are shown in the following table.

| | % of urea released in 7 days at 25° C. | |
|---|---|---|
| Sealant composition | Not abraded | Abraded |
| Composition of Example 1 | 20 | 50 |
| Composition of Example 2 | 43 | 93 |
| Composition of Example 3 | 20 | 62 |
| Composition of Example 4 | 13 | 56 |
| Hydrogenated tallow | 30 | 100 |

The composition of Example 4 had excellent slow release properties and abrasion resistance, but resulted in a sealed SCU granule in which the wax coating tended to flake off, and leave a slight dusty residue on the handling equipment. Thus the composition of Example 1 in which the hydrogenated tallow and the added polymer are crosslinked by the addition of dimer acid and a transesterification catalyst is superior.

I claim:

1. Controlled release particulate fertilizers comprising an inner core of urea; a layer of sulfur surrounding the said urea core; and a sealant covering said sulfur layer, said sealant comprising mixtures of
   A. from about 65 to about 98 percent by weight of at least one fatty acyl ester of a polyhydric alcohol; and
   B. from about 2 to about 25 percent of at least 1 polymer which is soluble in A, said polymers containing at least 1 moiety of the group including ester, carboxylate and hydroxyl functionality.

2. The composition of claim 1 wherein the sealant composition further comprises from about 0.05 to about 1 percent of a transesterification catalyst.

3. The composition of claim 1 wherein the sealant composition further comprises from about 0.5 to about 10 percent of at least one dicarboxylic or tricarboxylic acid containing from about 9 to about 60 carbon atoms.

4. The composition of claim 2 wherein the sealant composition further comprises from about 0.5 to about 10 percent of at least one dicarboxylic or tricarboxylic acid containing from about 9 to about 60 carbon atoms.

5. The composition of claim 1 wherein the fatty ester of A is a triglyceride in which the acyl moieties each contain about 14 to about 22 carbon atoms.

6. The composition of claim 1 wherein the polymer of B is at least one polymer selected from the group consisting of
   A. copolymers of ethylene and vinyl acetate containing from about 5 to about 40 percent vinyl acetate, said copolymers having melt indexes from about 1 to about 500;
   B. copolymers of ethylene and ethyl acrylate containing from about 15 to about 30 percent ethyl acrylate, said copolymers having melt indexes from about 1 to about 500; and
   C. copolymers of ethylene and acrylic acid containing less than about 10 percent acrylic acid.

7. The composition of claim 5 wherein the polymer of B is at least one polymer selected from the group consisting of
   A. copolymers of ethylene and vinyl acetate containing from about 5 to about 40 percent vinyl acetate, said copolymers having melt indexes from about 1 to about 500;
   B. copolymers of ethylene and ethyl acrylate containing from about 15 to about 30 percent ethyl acrylate, said copolymers having melt indexes from about 1 to about 500; and
   C. copolymers of ethylene and acrylic acid containing less than about 10 percent acrylic acid.

8. The composition of claim 1 in which the fatty ester of A is at least one ester is selected from the group consisting of hydrogenated tallow and hydrogenated soybean oil, said ester having an iodine value of less than about 15; and the polymer of B is a copolymer of ethylene and vinyl acetate containing from about 15 to 30 percent vinyl acetate and having a melt index of about 2 to about 5.

9. The composition of claim 4 in which the fatty ester of A is at least one ester selected from the group consisting of hydrogenated tallow and hydrogenated soybean oil, said ester having an iodine value of less than about 15; and the polymer of B is a copolymer of ethylene and vinyl acetate containing from about 15 to 30 percent vinyl acetate and having a melt index of about 2 to about 5.

10. The composition of claim 9 wherein the carboxylic acid is at least one acid selected from the group consisting of
    A. dimer acids derived from tall oil,
    B. trimer acids derived from tall oil, and
    C. the acrylic acid Diels-Alder adduct of conjugated linoleic acid,
and the transesterification catalyst is selected from the group consisting of tetraalkyl titanium esters and organotin compounds.

11. Controlled release particulate fertilizers comprising an inner core of urea; a layer of sulfur surrounding the said urea core; and a sealant covering said sulfur layer, said sealant consisting of a mixture of
    A. from about 80 to about 93 percent by weight of at least one fatty acyl ester selected from the group consisting of hydrogenated tallow and hydrogenated soybean oil;
    B. from about 5 to about 15 percent of a copolymer of ethylene and vinyl acetate containing about 28 percent vinyl acetate, said copolymer having a melt index of about
    C. from about 2 to about 5 percent of a dimer acid derived from tall oil; and
    D. from about 0.05 to about 0.2 percent dibutyltindilaurate.

* * * * *